United States Patent [19]
Freeman

[11] Patent Number: 5,330,260
[45] Date of Patent: Jul. 19, 1994

[54] WHEEL CLEANING SYSTEM

[76] Inventor: Ernie Freeman, 1460 W. 130th St., Brunswick, Ohio 44212

[21] Appl. No.: 942,433

[22] Filed: Sep. 9, 1992

[51] Int. Cl.⁵ .......................................... B62D 55/088
[52] U.S. Cl. ....................................... 305/12; 305/11
[58] Field of Search ............................ 305/11, 12, 60; 280/855

[56] References Cited

U.S. PATENT DOCUMENTS

| | | | |
|---|---|---|---|
| 2,560,307 | 7/1951 | Slemmons | 305/12 |
| 4,198,103 | 4/1980 | Ward et al. | 305/12 |
| 4,818,040 | 4/1989 | Mezzancella et al. | 305/12 |
| 4,830,439 | 5/1989 | Collins et al. | 305/12 X |

Primary Examiner—Russell D. Stormer
Attorney, Agent, or Firm—Pearne, Gordon, McCoy & Granger

[57] ABSTRACT

In a refuse compactor, a set of cutter blades, one on each wheel and one fixed relative to the wheel's associated axle operable to cut refuse entrained by the wheel and tending to be wrapped around the associated axle so as to avoid the build-up of refuse on the axle which otherwise can lead to unnecessary wear of the wheel and drive train as well as unnecessary fuel consumption.

9 Claims, 3 Drawing Sheets

WHEEL CLEANING SYSTEM

BACKGROUND OF THE INVENTION

The present invention relates to improvements in land vehicles and, in particular, to tractors used to compact refuse at a landfill.

PRIOR ART

The capacity of existing landfills has greatly diminished and the cost of establishing new landfills has greatly escalated due to environmental concerns. Thus, it is important that refuse materials deposited in a landfill be compacted as fully as is practical. To this end, specialized heavy tractors have been developed to spread and roll over newly received refuse. Currently, these tractors are fitted with large steel wheels that include projections that operate to disintegrate the refuse while it is being compacted by the pressure of the wheels. A serious problem has existed with the operation of this kind of equipment where refuse tends to be tightly wrapped around the wheel axles as the wheels rotate. Materials such as sheet metal, metal bar, pipe, rugs and other sinewy components are entrained by a wheel causing it to wrap around its associated axle. Typically, the wheel center is hollow and the entrained material accumulates around the axle and in the inboard side of the wheel.

The accumulation of refuse on the axle and in the wheel has several disadvantages. A large drag resisting wheel rotation is produced causing unnecessary fuel consumption. The drive train is subjected to unnecessary wear to overcome this drag or resistance. The wheels, which are relatively expensive, wear out prematurely because the refuse accumulated on the axle rubs against the wheel surfaces causing severe abrasion.

Complicating this situation is the lack of any quick, practical way of removing the accumulated material from its entanglement with an axle and wheel. The practice is to remove the material with hand labor and this is dangerous to the workman. There is a risk of grasping a razor sharp edge of a broken or torn article hidden in various unsanitary debris and even heavy gloves may not afford sufficient protection to the workman's hands.

SUMMARY OF THE INVENTION

The invention provides a method and apparatus for eliminating the build-up of harmful accumulations of refuse material around the axle of a refuse compactor. The apparatus comprises a pair of cutter blades associated with a wheel and its respective axle. One of the cutter blades is fixed on the wheel and the other is fixed with respect to the axle. Rotation of the wheel causes its cutter to revolve in a path that sweeps sufficiently close to the fixed cutter to produce a shearing or cutting action therewith. Material entrained by a wheel that begins to be wrapped around an axle is severed by the pair of blades. The severing action prevents the material from being wound in multiple ever-tightening turns. Once the material is severed, it tends to fall off the axle area thereby avoiding a build-up of the same.

In the preferred embodiment, the cutter blades have edges that are in general parallel alignment with the wheel axis. Additionally, the areas forming the blade edges are plate-like in configuration and can operate in either direction of rotation of the wheel. The disclosed cutter blades are arranged to be retrofitted on existing tractors. A blade to be fixed to the chassis is a simple plate that is pre-drilled with holes that align with holes or other reference formations provided on the tractor as it comes from the factory. Once properly located, this cutter blade can be securely welded in place on the chassis. Where, as is conventional, the inside face of the wheel is a concave cone, the cutter blade for the wheel includes a gussetted base that has a shape which is complementary to the cone dimensions. This complementary configuration allows the blade to be readily and securely welded onto the inner wheel face.

DESCRIPTION OF THE PREFERRED EMBODIMENT

Figure 1:
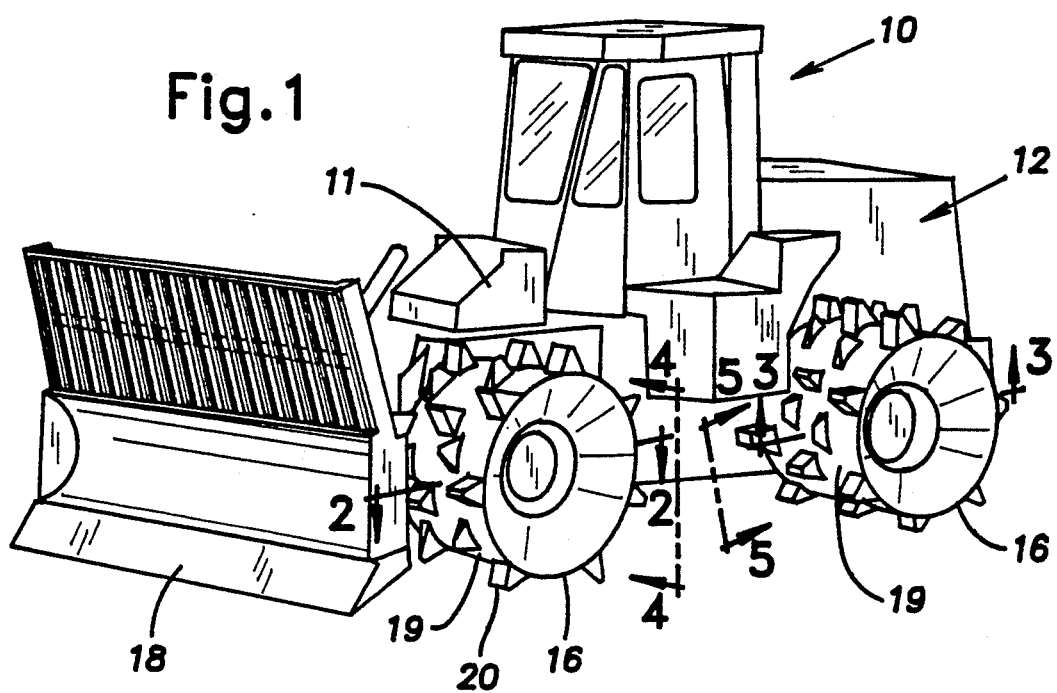
FIG. 1 is a perspective view of a refuse compactor employing the present invention.

A large self-propelled four-wheeled tractor illustrated in FIG. 1 is known in the landfill industry as a compactor. Commonly known examples of such tractors are machines marketed by Caterpillar, Inc. under the model designations CAT 826C; CAT 816B. A compactor 10 includes a chassis 11 on which is carried an engine and drive train generally indicated at 12 that propel the front and rear wheels 16 selectively for either forward or backward rotation. An adjustable blade 18 at the front of the compactor chassis 11 is used to distribute refuse in a landfill while the wheels 16 compact the same as the compactor 10 rolls back and forth over the landfill area being filled. Typically, the wheels 16 are large diameter steel weldments.

Figure 4:
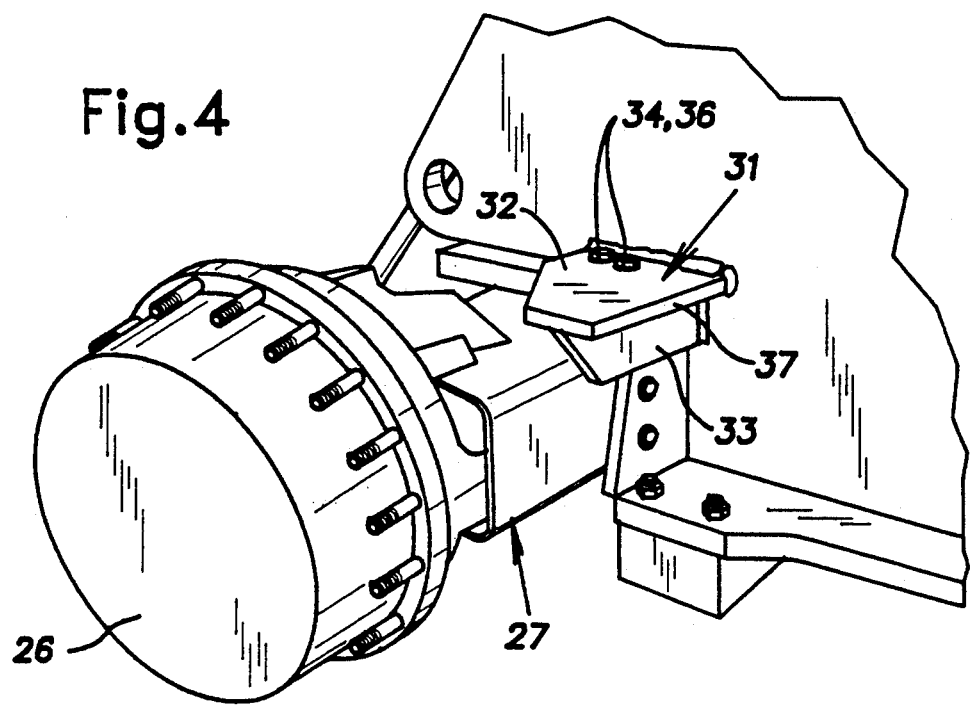
FIG. 4 is a fragmentary perspective view taken in the direction of arrows 4—4 in FIG. 1 of the stationary cutter blade associated with the left front axle.

A wheel 16 includes an outer cylindrical rim or thread 19 on which are fixed a multitude of projecting teeth 20 that tend to cut and otherwise disintegrate the refuse being compacted. The center of a wheel 16 is comprised of a pair of truncated steel cones 21, 22 at the inboard and outboard wheel sides, respectively. The center cones 21, 22 are arranged so that each face of the wheel is concave. The outer peripheries of the cones, 21, 22 are welded to the thread cylinder and the inner peripheries are welded to a cylindrical tubular hub 23. A mounting flange 24 on the inner periphery of the hub 24 has a series of spaced holes for mounting the wheel 16 to a final drive unit 26 of a respective axle 27 or 28. The left front axle 27 is shown most clearly in FIGS. 2 and 4. The wheel and axle axis is shown at 29.

In accordance with the invention, a cutter blade assembly 31 is installed on the chassis 11 in fixed relation to the associated front axle 27. The cutter blade assembly 31 is a weldment of heavy flat steel plate of, for example, one inch hot rolled steel. The cutter blade assembly 31 comprises a horizontal cutter plate 32 and a vertical gusset 33 at right angles to the plate. Ideally, the cutter plate 32 includes a pair of holes 34 which serve as visual indicia and indexing means to properly align the plate 32 and gusset 33 with the chassis axle 27 (in the illustrated case the axle 27 is rigidly fixed to the chassis 11). When the cutter plate 32 is properly aligned, the holes 34 register with threaded holes in the chassis 11 provided by the factory. Bolts 36 are assembled into the holes 34 and threaded chassis holes to hold the cutter blade assembly 31 in position allowing the plate 32 and gusset 33 to be welded to the chassis or frame 11. The plate 32 has a cutting edge 37 parallel to and spaced from the axis 29 and extending substantially into the cavity of the wheel formed by the inboard center cone 21.

Figure 3:
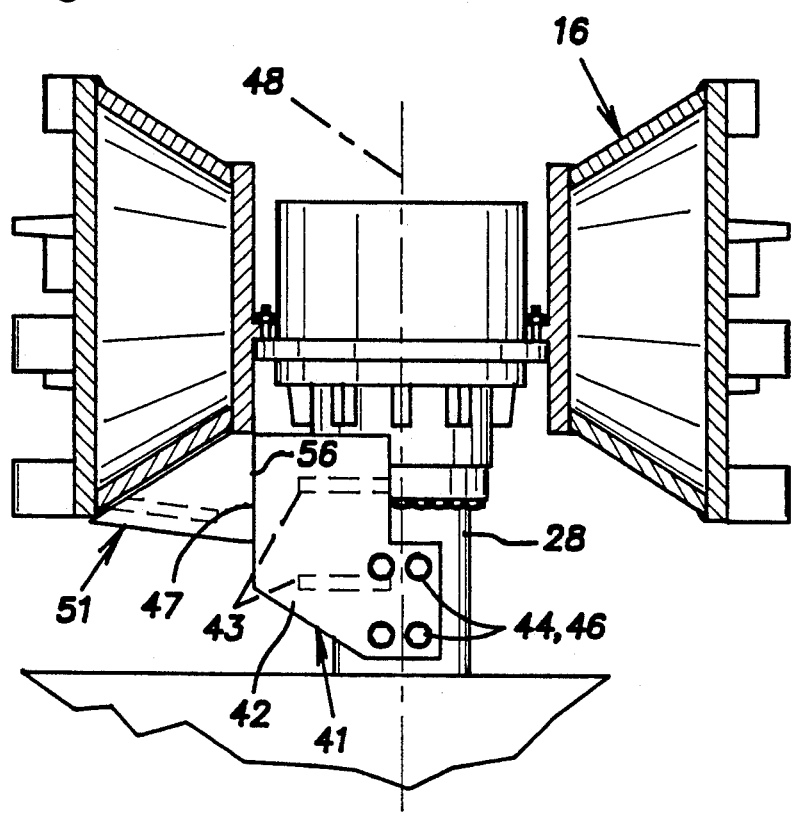
FIG. 3 is a somewhat schematic, fragmentary view taken in the plane 3—3 illustrated in FIG. 1 of a left rear axle illustrating a pair of associated cutter blades.
Figure 5:
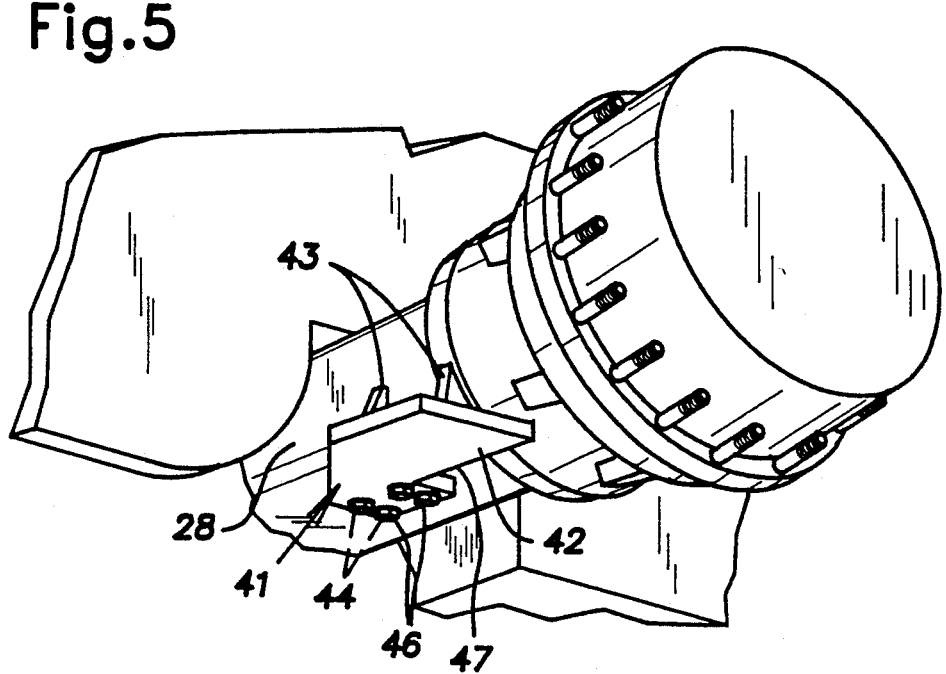
FIG. 5 is a fragmentary perspective view taken in the direction of arrows 5—5 in FIG. 1 of the cutter blades associated with the left rear axle.

Similar to the situation described with respect to the front axle 27, the rear axle 28 is provided with a cutter blade assembly 41 shown in FIGS. 3 and 5. The cutter blade assembly 41 is fabricated as a weldment of heavy steel plate of, for example, one inch thick hot rolled steel. The assembly 41 includes an L-shaped horizontal cutter plate or blade 42 and a pair of spaced triangular vertical gussets 43. The cutter plate 42 is provided with a set of holes forming visual indicia 44 that register with threaded bosses on the underside of the rear axle 28 for purposes of visually and physically aligning the cutter blade assembly 41 with the axle 28. With bolts 46 assembled in the holes 44 and threaded into the bosses the cutter blade assembly 41 is properly located on the axle 28. The cutter plate or blade assembly 41 is then welded to the axle 28 along the edges of the plate 42 and the gussets 43. The cutter plate 42 includes a cutting edge 47 parallel to and spaced from the axis 48 of the axle 28. The cutting edge 47 extends substantially into the cavity of the associated wheel 16 formed by the inboard cone 21. The front and rear axles on the right side of the compactor 10 are provided with cutter blade assemblies which are mirror images of the described cutter blade assemblies 31 and 41.

Figure 6:
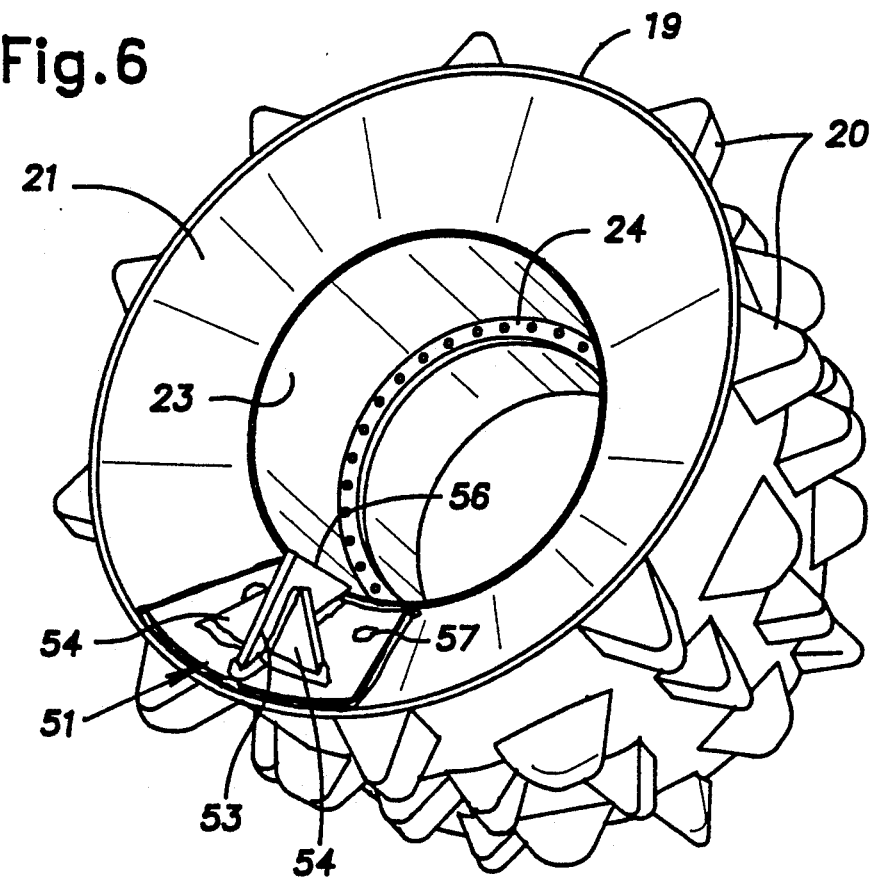
FIG. 6 is a perspective view of an inside face of a typical wheel.

FIG. 6 shows the inside face of a typical wheel 16 in perspective. A wheel cutter blade assembly 51 is fixed to the inboard wheel center or cone 21 as by welding. The cutter blade assembly 51 is a heavy steel plate weldment of hot rolled steel and includes a mounting base plate 52 of ½ inch thickness, a triangular cutter plate or blade 53 of one inch thickness, and a pair of triangular gussets 54 of one inch or ¾ inch thicknesses on opposite sides of the cutter plate 53 bracing the cutter plate against deflection out of its plane. The mounting base plate 52 preferably has a geometry that is complementary to the exposed surface of the center cone 21 such that it has a surface that has a conical configuration which is essentially the same as the exposed surface of the center cone. A convenient way of fabricating the base plate 52 is to roll a steel plate into a cone 21 that closely fits into the exposed face of the center cone and to cut the rolled cone into segments analogous to slices of a pie of suitable arcuate extent. The cutter plate 53 includes a cutting edge 56 that is parallel and spaced from the axis of the wheel which is, of course, coincident with the axis of the axles 27 and 28.

The cutter blade assembly 51 is fixed to the wheel 16 by welding the periphery of the mounting base plate 52 to the center cone 21 and by plug welding through preformed holes in the mounting base at points designated by the numeral 57. The dimensions of the mounting base 52 in a plane perpendicular to the cutting plate 53 are of the same order of magnitude as the major dimensions of the cutting plate to yield a rugged stable assembly with the wheel 16 when welded thereto as described. Preferably, each of the wheels 16 are constructed in essentially the same manner.

Figure 2:
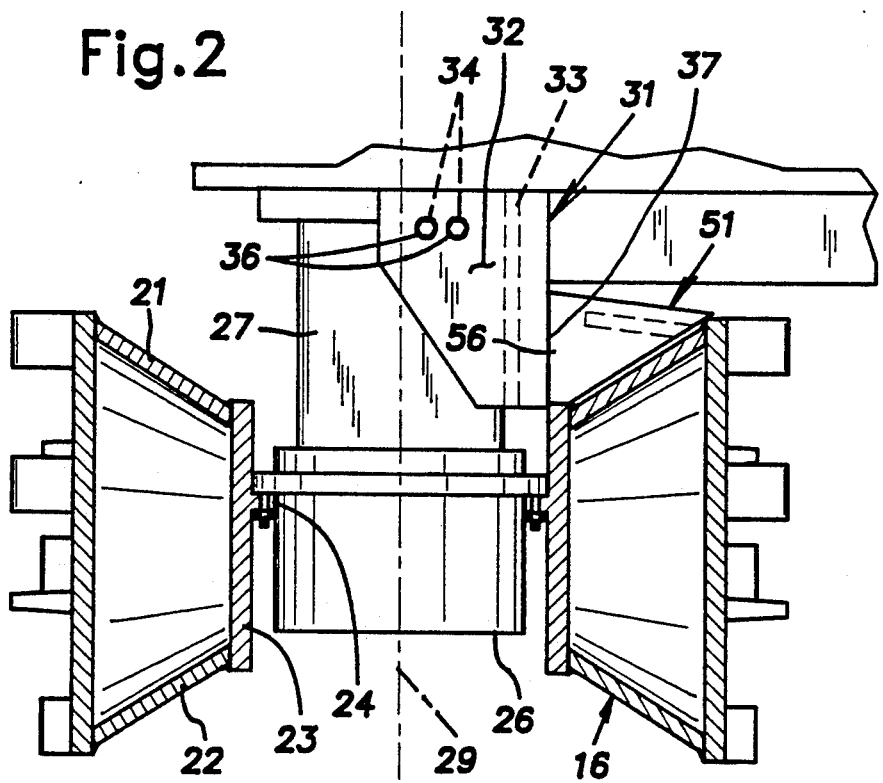
FIG. 2 is a somewhat schematic, fragmentary view taken in the plane 2—2 illustrated in FIG. 1 of a left front axle illustrating a pair of associated cutter blades.

As shown in FIGS. 2 and 3, the fixed cutter blades 32 and 42 are aligned with the associated wheel cutter blade or plate 53 such that they have substantially the same location along the axis of the respective axle 27, 28. The various parts are proportioned so that there is a slight radial clearance of, for example, ⅛ inch, between their respective cutting edges 37 or 47 and 56. The function of the stationary axle cutter blades 32 or 42 and the wheel cutter blades 53 is the same at each wheel 16. As a wheel 16 turns, the wheel cutter blade 53 sweeps past the stationary cutter blade 32 or 42 in a circular path about the axis 29, 48 of the respective axle 27, 28. When the movable wheel cutter blade 53 passes the stationary axle cutter blade 32, 42 any refuse material entrained by a wheel 16 and tending to be wrapped about the axle is cut or sheared by the edges 37 or 47 and 56 or is at least scored by such edges if not fully severed. The cut or scored material is, consequently, unable to entwine itself around an axle and build-up in the wheel cavity formed by the center cone 21. The cutter blades 32, 42 and 53 are bi-directional, working efficiently in either direction of wheel rotation.

The disclosed cutter arrangement is particularly suited for retrofitting compactors in the field. A kit of axle and wheel cutter blade weldment assemblies is provided generally as described above for a particular model of tractor or compactor and wheel style fitted to such compactor. The wheels are preferably removed to facilitate welding of the cutting assemblies on the chassis or axles and the wheels. When the cutter assemblies have been welded up on the chassis or axles and on the wheels, the wheels are replaced on their axles. It has been found that a particularly efficient technique of fitting a set of stationary and rotating cutter blades is to initially provide the stationary cutter assemblies with extra stock in the cutter plate at the cutting edge so that there is some interference between the stationary and rotating cutter plates or blades. Each wheel is manually rotated until the wheel cutter plate contacts the stationary cutter plate. Then, a cutting torch is used to burn the interfering material away from the stationary cutter plate leaving a slight clearance of about ⅛ inch between the resulting cutting edge and the wheel cutting edge.

It should be evident that this disclosure is by way of example and that various changes may be made by adding, modifying or eliminating details without departing from the fair scope of the teaching contained in this disclosure. For example, the cutter blades can be forged or cast with integral reinforcement gussets or ribs. The invention is therefore not limited to particular details of this disclosure except to the extent that the following claims are necessarily so limited.

What is claimed is:

1. A kit for reducing the tendency of debris to be wound around and accumulated on the axle of a refuse compactor comprising a cutter body to be attached to the inboard face of a wheel and a cutter plate to be attached to the compactor on a part that is stationary with respect to an axle associated with the wheel, the cutter body having a cutting edge and a mounting area for mating with a receiving area of the wheel, the cutting edge having an effective length, at least parts of the cutting edge being spaced from the mounting area a distance that is the same order of magnitude as the effective length, the mounting area extending in at least two directions each with dimensions at least the same order of magnitude as the effective length of the cutting edge to provide a stable mounting so as to reliably resist high cutting forces when it is attached to the wheel, the cutter plate having an edge with an effective length substantially the same as the effective cutting length of the cutter body, the cutter plate having visual indicia to permit it to be aligned with a reference location on the compactor to facilitate its proper positioning thereon and having sufficient reinforcement in a plane perpendicular to a plane in which its cutting edge lies.

2. A method of reducing the build-up of trash around the axle of a wheeled refuse compactor comprising the steps of rigidly providing a fixed cutting edge at the axle with sufficient reinforcement in a plane perpendicular to a plane in which the cutting edge lies and a cooperating movable cutting edge with an effective length on a wheel, arranging the fixed and movable cutting edges so that the movable cutting edge is spaced a relatively large distance of the same order of magnitude as its effective length from a supporting surface where it is mounted on the wheel and so that upon rotation of the wheel, the movable cutting edge moves past the fixed cutting edge in relative close proximity to it to sever material tending to accumulate on the axle.

3. A method as set forth in claim 2, wherein said cutting edge on the wheel is provided by a flat plate having face dimensions substantially greater than its thickness welded to the inner face of the wheel.

4. A method as set forth in claim 3, wherein the flat plate is provided with a mounting base that is complementary to a concave conical inboard face of the wheel.

5. A method as set forth in claim 2, wherein said cutting edges are arranged generally parallel to and spaced from the axis of the axle.

6. A method as set forth in claim 5, wherein the fixed cutting edge is provided by a generally flat plate fixed in a horizontal plane.

7. A method as set forth in claim 6, wherein both said fixed and movable cutting edges are formed by flat plates welded to supports formed by a chassis and axle assembly and the wheel.

8. A method as set forth in claim 7, wherein one of said plates is cut for clearance after being welded to its associated support and being brought into close proximity to the other plate by rotation of the wheel.

9. A self-propelled multi-wheeled compactor for refuse comprising a chassis, a pair of spaced axles on the chassis, a set of wheels rotatably supported on the axles, an engine and a drive train on the chassis for driving at least a pair of said wheels in rotation on their associated axle or axles, the wheels having inboard sides facing towards the chassis, the wheels each having a cutter blade mounted on it at a location which revolves in a path around its associated axle, a stationary cutter blade rigidly mounted with respect to each associated axle at a location generally tangent to the path of the revolving cutter blade, the rotational and stationary cutter blades having cooperating cutting edges that operate to shear refuse that tends to be entrained by the associated wheel and wrapped around the associated axle, at least portions of the cutting edge of the revolving cutter blade being spaced from its respective wheel a distance that is substantially greater than ten times the operating clearance between the cutting edges, each stationary cutter blade including reinforcing means extending in a plane perpendicular to a plane in which its respective cutting edge lies.

* * * * *